US009079132B2

(12) United States Patent
Handley et al.

(10) Patent No.: US 9,079,132 B2
(45) Date of Patent: *Jul. 14, 2015

(54) FILTER ARRANGEMENT AND METHODS

(71) Applicant: Donaldson Company, Inc., Minneapolis, MN (US)

(72) Inventors: Michael Handley, Farmington, MN (US); Dominique Renwart, Hoegaarden (BE); Benjamin Nichols, Bierbeek (BE); Herman Vanormelingen, Nieuwerkerken (BE); Jimmy Vanderlinden, Herent (BE); Timothy Sporre, Brooklyn Park, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 53 days.

This patent is subject to a terminal disclaimer.

(21) Appl. No.: 13/975,957

(22) Filed: Aug. 26, 2013

(65) Prior Publication Data

US 2014/0033664 A1 Feb. 6, 2014

Related U.S. Application Data

(63) Continuation of application No. 12/821,318, filed on Jun. 23, 2010, now Pat. No. 8,518,142.

(60) Provisional application No. 61/220,107, filed on Jun. 24, 2009.

(51) Int. Cl.
*B01D 46/52* (2006.01)
*B01D 46/10* (2006.01)
(Continued)

(52) U.S. Cl.
CPC .......... *B01D 46/103* (2013.01); *B01D 46/0001* (2013.01); *B01D 46/125* (2013.01); *B01D 46/522* (2013.01); *B01D 46/525* (2013.01); *Y10T 29/49826* (2015.01); *Y10T 156/1025* (2015.01)

(58) Field of Classification Search
CPC ............. B01D 46/0001; B01D 46/103; B01D 46/125; B01D 46/521; B01D 46/522; B01D 46/525
USPC .............. 55/484, 486, 497, 502, 521, DIG. 5, 55/DIG. 31
See application file for complete search history.

(56) References Cited

U.S. PATENT DOCUMENTS 3,490,211 A 1/1970 Cartier
3,631,582 A 1/1972 Lucas et al.
(Continued)

FOREIGN PATENT DOCUMENTS

CH 602 157 7/1978
DE 27 39 815 A1 9/1978
(Continued)

OTHER PUBLICATIONS

"FGT V-Bank Final Filter," DRB Industries, publicly available before Jun. 23, 2010, 2 pages.
(Continued)

*Primary Examiner* — Robert Clemente
(74) *Attorney, Agent, or Firm* — Merchant & Gould P.C.

(57) ABSTRACT

A filter element includes a single seamless media pack having first and second opposite ends and first and second lateral sides extending between the first and second ends. The media pack also has pleats extending between the first and second ends and a first cross-section defined between the first and second lateral sides. The first cross-section having at least one outward projection that defines an internal radius of at least ¼ inch wherein a plurality of pleats of the media pack are fanned around the internal radius. A first end cap is secured to the first end of the media pack while a second end cap secured to the second end of the media pack. Additionally, a frame member is secured to the first end cap, second end cap, the first lateral side, and the second lateral side. A pre-filter is usable with described filter arrangements.

16 Claims, 9 Drawing Sheets

(51) Int. Cl.
  *B01D 46/12* (2006.01)
  *B01D 46/00* (2006.01)

(56) References Cited

U.S. PATENT DOCUMENTS

| | | | |
|---|---|---|---|
| 5,098,767 | A | 3/1992 | Linnersten |
| 5,575,826 | A | 11/1996 | Gillingham et al. |
| 5,679,122 | A | 10/1997 | Moll et al. |
| 5,871,836 | A | 2/1999 | Schultink et al. |
| 6,447,566 | B1 | 9/2002 | Rivera et al. |
| 6,533,847 | B2 | 3/2003 | Seguin et al. |
| 6,602,328 | B2 | 8/2003 | Doi et al. |
| 6,932,850 | B1 | 8/2005 | Welch et al. |
| 7,128,771 | B2 | 10/2006 | Harden |
| 7,588,618 | B2 | 9/2009 | Osborne et al. |
| 7,883,562 | B2 | 2/2011 | Healey et al. |
| 7,901,479 | B2 | 3/2011 | Osborne et al. |
| 7,931,723 | B2 | 4/2011 | Cuvelier |
| 8,052,770 | B2 | 11/2011 | Ayshford et al. |
| 8,105,409 | B2 | 1/2012 | Mann et al. |
| 8,197,569 | B2 | 6/2012 | Healey et al. |
| 8,202,340 | B2 | 6/2012 | Healey et al. |
| 8,257,459 | B2 | 9/2012 | Healey et al. |
| 8,303,678 | B2 | 11/2012 | Steele et al. |
| 8,518,142 | B2 * | 8/2013 | Handley et al. .......... 55/521 |
| 2002/0121077 | A1 | 9/2002 | Kim et al. |
| 2004/0141835 | A1 | 7/2004 | Katayama et al. |
| 2006/0059876 | A1 | 3/2006 | Yuan et al. |
| 2007/0209343 | A1 | 9/2007 | Cuvelier |

FOREIGN PATENT DOCUMENTS

| | | |
|---|---|---|
| DE | 38 22 443 A1 | 3/1989 |
| DE | 42 27 744 A1 | 2/1994 |
| DE | 10 2007 024 287 A1 | 11/2008 |
| EP | 0 383 525 A1 | 8/1990 |
| EP | 0 479 114 A1 | 4/1992 |
| EP | 0 898 997 A1 | 3/1999 |
| EP | 1 582 248 A1 | 10/2005 |
| GB | 2 218 009 A | 11/1989 |
| JP | 8-19720 | 1/1996 |
| WO | WO 98/45021 | 10/1998 |
| WO | WO 02/26349 A1 | 4/2002 |

OTHER PUBLICATIONS

"PM 'W' Compactfiltre," PM Filter Group brochure, 1993, 1 page.
International Search Report and Written Opinion mailed Sep. 29, 2010.

* cited by examiner

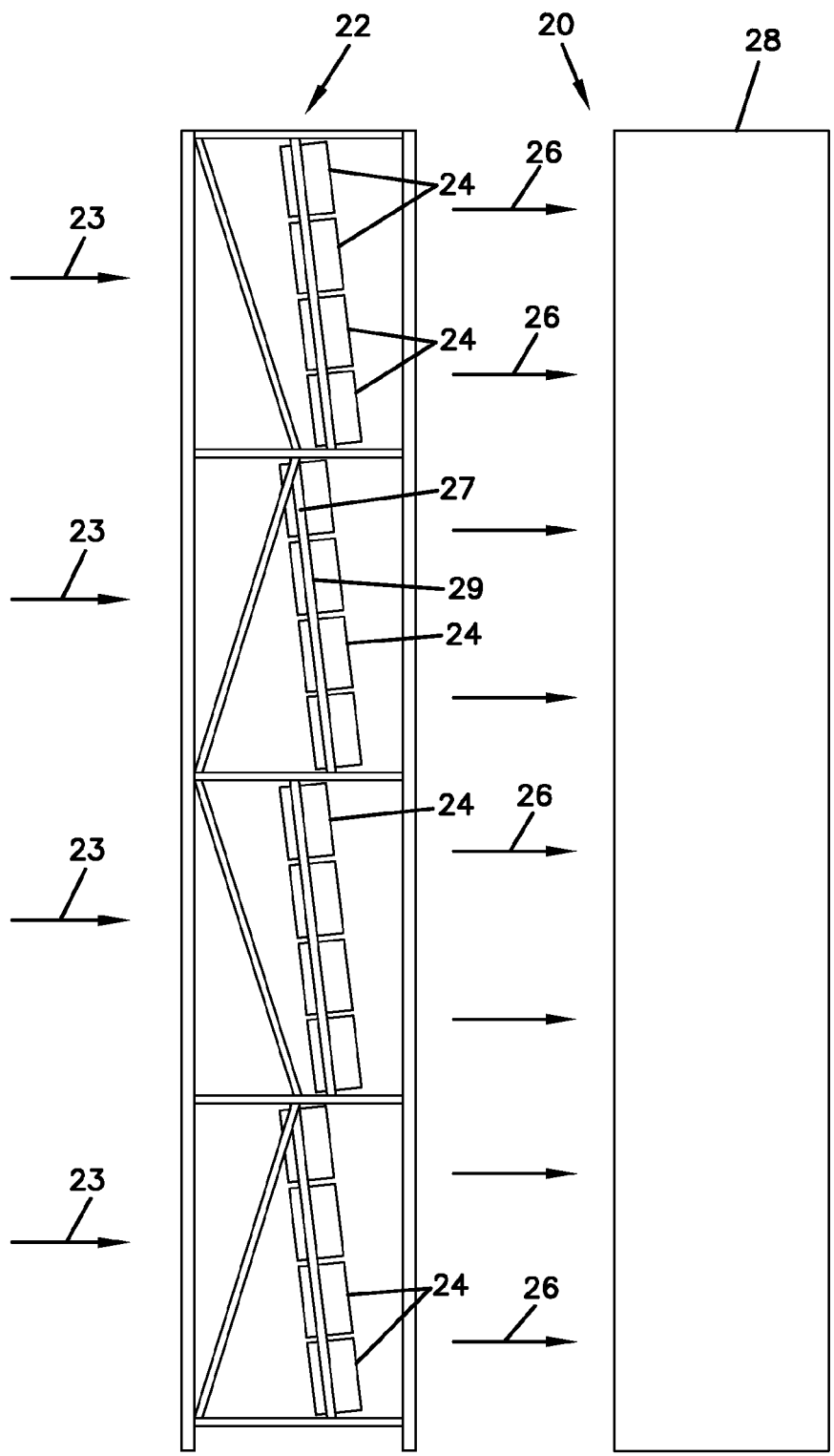

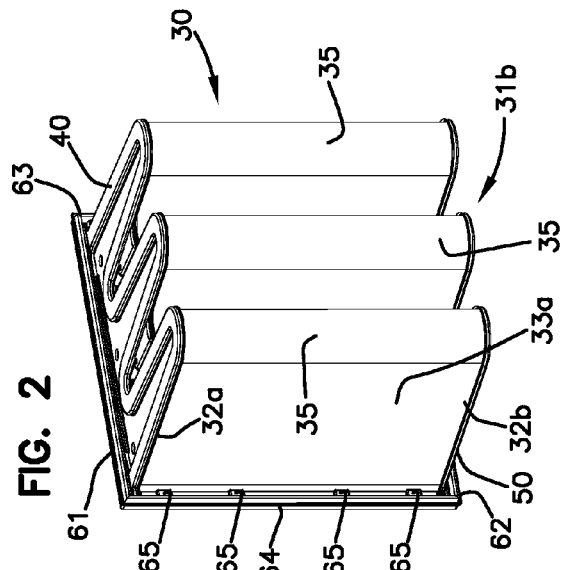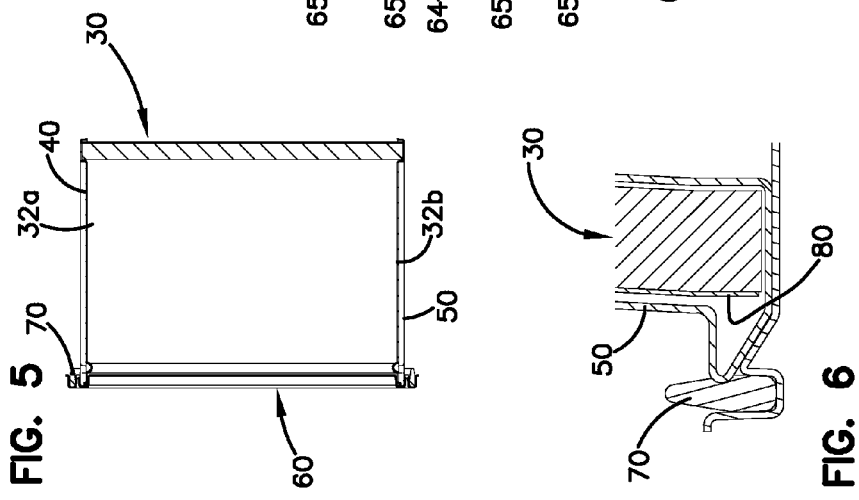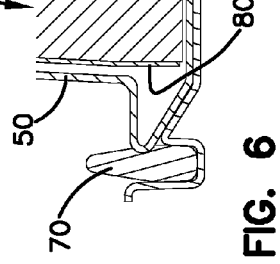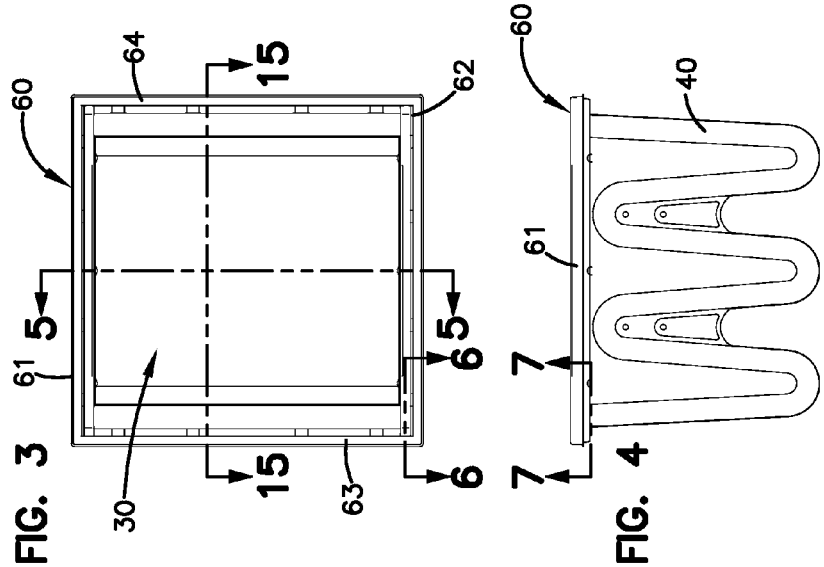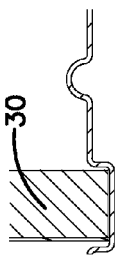

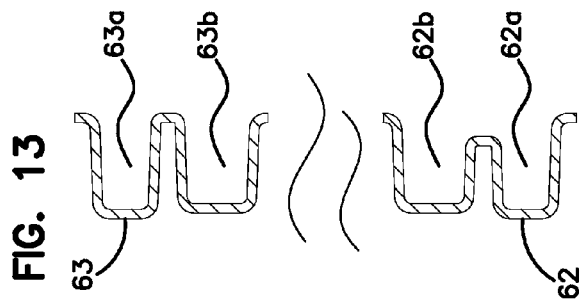
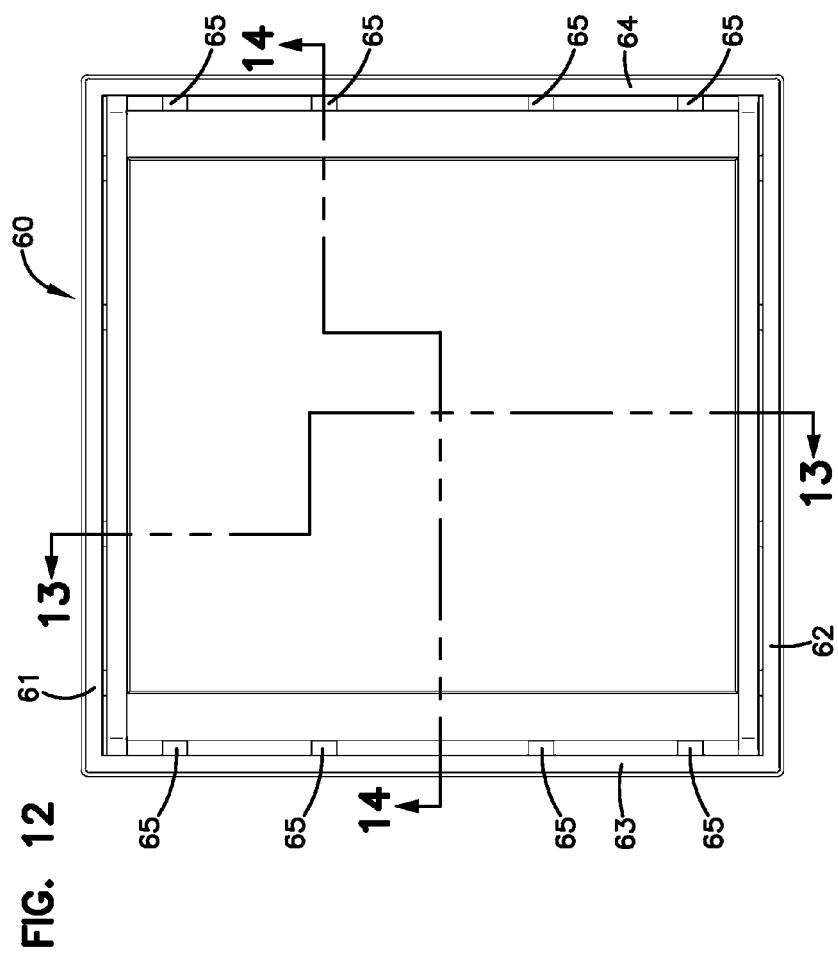
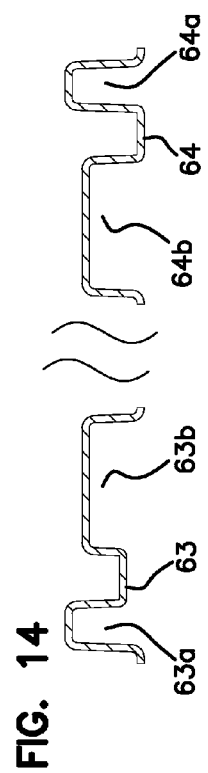

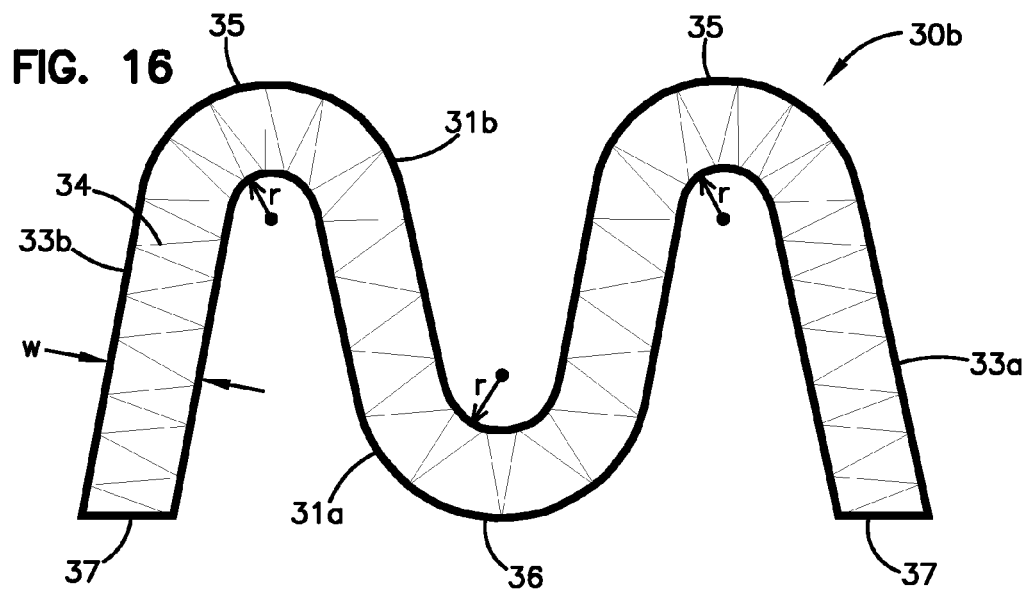
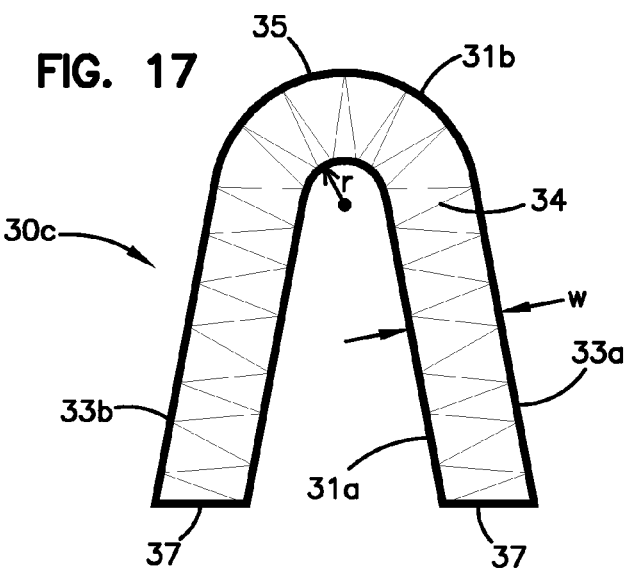

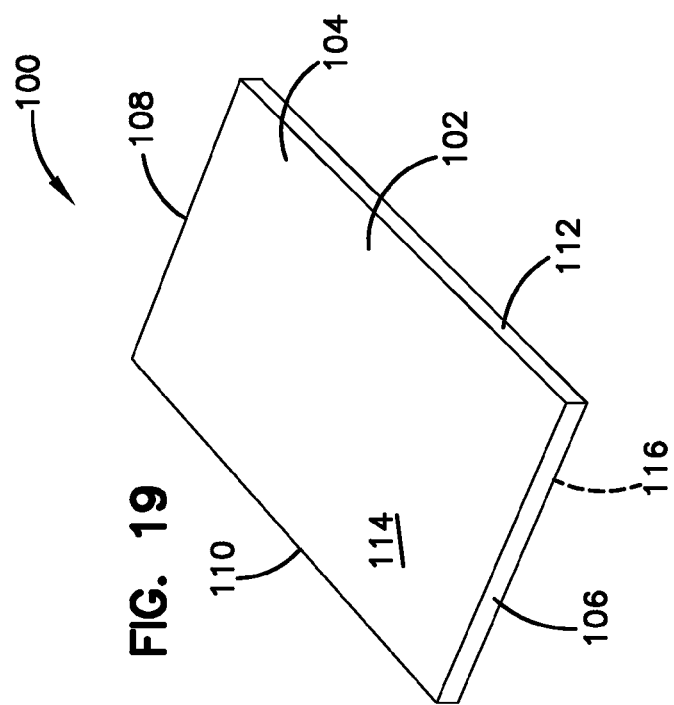
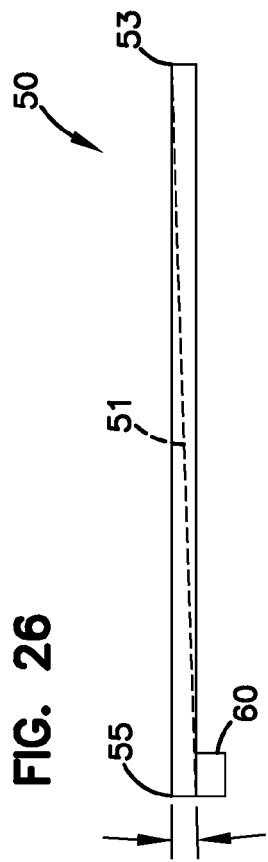
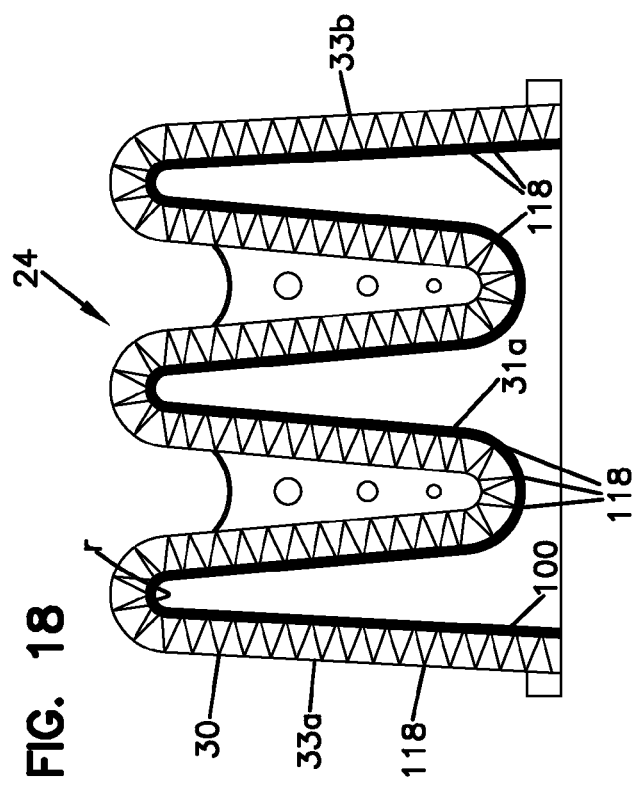

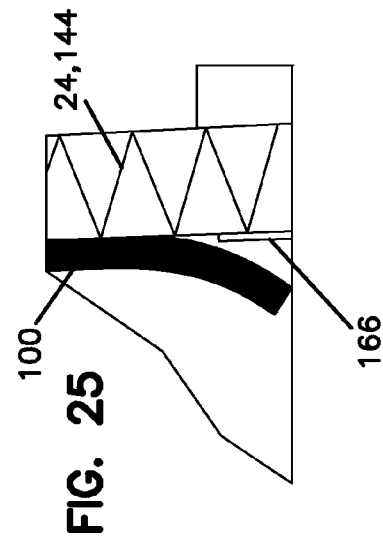
FIG. 23
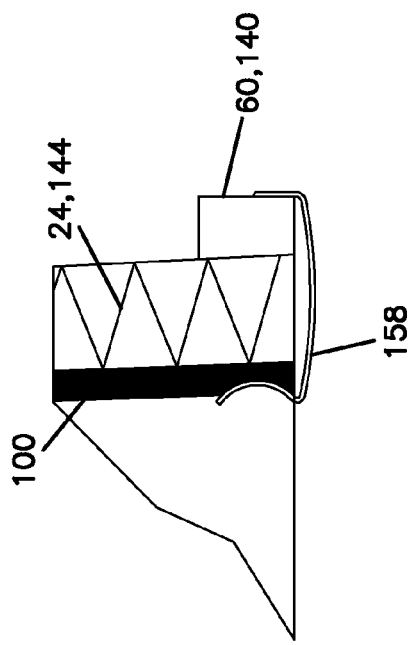
FIG. 25
FIG. 20
FIG. 24

FILTER ARRANGEMENT AND METHODS

CROSS-REFERENCE TO RELATED APPLICATIONS

This application is a continuation of application Ser. No. 12/821,318, filed Jun. 23, 2010, which application claims the benefit of provisional application Ser. No. 61/220,107 filed Jun. 24, 2009, which applications are incorporated herein by reference in their entirety.

TECHNICAL FIELD

This disclosure describes filter constructions for filtering fluids, such as gas or liquid. In particular, this disclosure describes a filter element comprising a seamless media pack, a housing, and methods particularly useful with gas turbine systems.

BACKGROUND

Gas turbine systems are useful in generating electricity. These types of systems are particularly convenient in that they can be constructed quickly; they are also desirable because they produce fewer harmful emissions than coal or oil based turbine systems. Gas turbines utilize air for combustion purposes. Due to the precision moving parts in these types of systems, the combustion air needs to be clean. To ensure clean air for combustion, air filters have been used to clean the air taken into the gas turbine system. In prior art systems, a series of panel filters have been used to clean intake air. As systems became more sophisticated, cleaner air was required. This caused an increase in cost.

Improvements in cleaning air intake into gas turbine systems is desirable.

SUMMARY OF THE DISCLOSURE

In one aspect, the disclosure describes a filter element. In general, the filter element includes a single seamless media pack having first and second opposite ends and first and second lateral sides extending between the first and second ends. The media pack also has pleats extending between the first and second ends and a first cross-section defined between the first and second lateral sides. The first cross-section having at least one outward projection that defines an internal radius of at least ¼ inch wherein a plurality of pleats of the media pack are fanned around the internal radius. A first end cap is secured to the first end of the media pack while a second end cap secured to the second end of the media pack. Additionally, a frame member is secured to the first end cap, second end cap, the first lateral side, and the second lateral side. A gasket is also provided that is held by the frame member wherein the gasket extends along the first end cap, second end cap, first lateral side, and second lateral side. In certain configurations, the media pack may also include a plurality of inward recesses and outward projections that produce a cross-section having a wavy shape.

In another aspect, an air intake for a gas turbine system is disclosed that uses a filter element similar to that previously described. The air intake includes a tube sheet having a plurality of apertures wherein the filter element is oriented within at least at least one of the apertures and sealed against the tube sheet. The filter element also includes a gasket that forms a seal against the tube sheet.

Systems for using preferred filter arrangements are described. Particularly useful systems include intake air systems for gas turbine systems.

Another aspect includes methods for operating and servicing. Preferred methods include constructions configured according to principles described herein.

In another aspect, a pre-filter can be used with the filter elements as characterized herein. The pre-filter comprises a removable and replaceable, frameless, seamless, non-pleated pad of media. The pre-filter is oriented against at least some of the upstream pleat tips between the first and second lateral sides and within the internal radius of the filter element.

In another aspect, a filter assembly is provided. The filter assembly includes a primary filter element including a plurality of media extensions arranged adjacent to each other. Adjacent ones of the media extensions form a vertex and diverge from the adjacent media extension. The primary filter element has an upstream side and downstream side. The filter assembly also includes a pre-filter comprising a removable and replaceable, frameless, seamless, non-pleated pad of media. The pre-filter is removably oriented against the upstream side of each of the media extension and within the vertex.

BRIEF DESCRIPTION OF THE DRAWINGS

FIG. 1 is a schematic view of one embodiment of an air intake system for a gas turbine system having air filter arrangements constructed according to principles disclosed herein.

FIG. 2 is a schematic, perspective view of one embodiment of a filter element.

FIG. 3 is a schematic, front view of the filter element of FIG. 2.

FIG. 4 is a schematic, top view of the filter element of FIG. 2.

FIG. 5 is a schematic, cross-sectional view of the filter element of FIG. 2, taken along the line 5-5 shown in FIG. 3.

FIG. 6 is a schematic, cross-sectional view of the filter element of FIG. 2, taken along the line 6-6 shown in FIG. 3.

FIG. 7 is a schematic, cross-sectional view of the filter element of FIG. 2, taken along the line 7-7 shown in FIG. 4.

FIG. 12 is a schematic, front view of a frame of the filter element of FIG. 2.

FIG. 13 is a schematic, cross-sectional view of the frame of FIG. 12, taken along the line 13-13 shown in FIG. 12.

FIG. 14 is a schematic, cross-sectional view of the frame of FIG. 12, taken along the line 14-14 shown in FIG. 12.

FIG. 16 is a schematic, cross-sectional view of a second embodiment of a media pack having two outward projections and one recess.

FIG. 17 is a schematic, cross-sectional view of a third embodiment of a media pack having only one outward projection.

FIG. 18 is a schematic, top, cross-sectional view of the filter element of FIG. 1 and including a pre-filter.

FIG. 19 is a perspective view of one embodiment of the pre-filter of FIG. 18.

FIG. 20 is a schematic, top, cross-sectional view of the pre-filter of FIG. 19 utilized with another embodiment of a filter element.

FIG. 23 is a schematic, partial, cross-sectional view of the pre-filter of FIG. 19 secured to the element of FIG. 18 or FIG. 20 according to a first means.

FIG. 24 is a schematic, partial, cross-sectional view of the pre-filter of FIG. 19 secured to the element of FIG. 18 or FIG. 20 according to a second means.

FIG. 25 is a schematic, partial, cross-sectional view of the pre-filter of FIG. 19 secured to the element of FIG. 18 or FIG. 20 according to a third means.

FIG. 26 is a schematic side view of the second end cap used with the filter element of FIG. 1.

DETAILED DESCRIPTION

Figure 8:
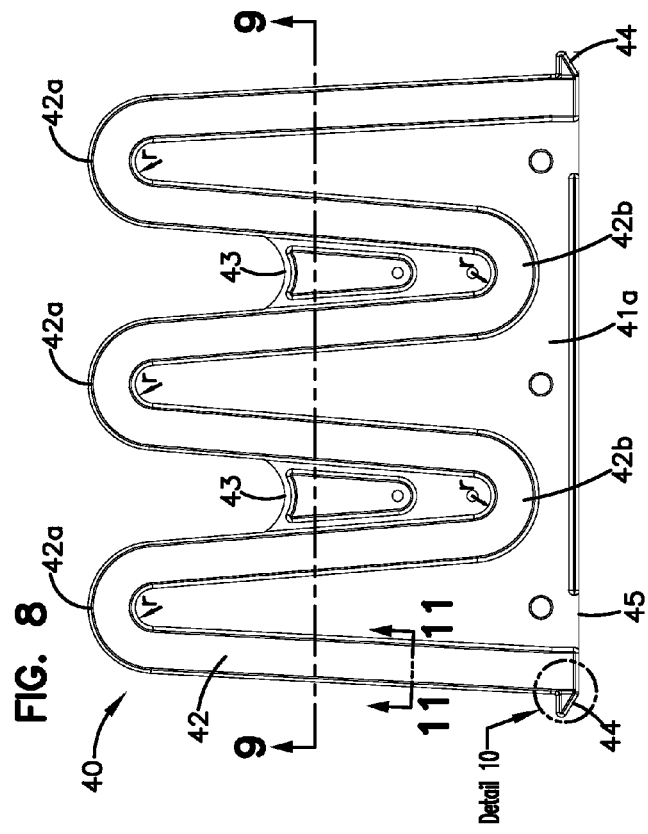
FIG. 8 is a schematic, top view of an end cap of the filter element of FIG. 2.
Figure 9:
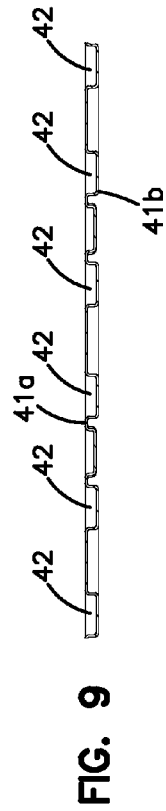
FIG. 9 is a schematic, cross-sectional view of the end cap of FIG. 8, taken along the line 9-9 shown in FIG. 8.
Figure 10:
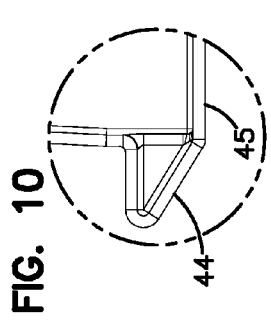
FIG. 10 is a schematic, enlarged view of a portion of the end cap of FIG. 8, shown at Detail 10 of FIG. 10.
Figure 11:
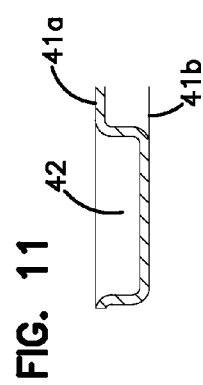
FIG. 11 is a schematic, cross-sectional view of the end cap of FIG. 8, taken along the line 11-11 shown in FIG. 8.

Reference will now be made in detail to exemplary aspects of the present invention that are illustrated in the accompanying drawings. Wherever possible, the same reference numbers will be used throughout the drawings to refer to the same or like parts.

A. FIG. 1, System of Use

The air filter elements and constructions disclosed herein are usable in a variety of systems. FIG. 1 depicts one particular system, in this case, a gas turbine system schematically at 20.

In FIG. 1, airflow is shown drawn into an air intake system 22 at arrows 23. The air intake system 22 includes a plurality of air filter elements 24 generally held in a tube sheet 27 having a plurality of apertures 29. In preferred systems, the tube sheet 27 will be constructed to hold the filter elements 24 at an angle, relative to a vertical axis. Preferred angles will be between 5-25°, for example, about 7°. This permits liquid to drain from the filter elements 24 when the system 20 is not operating.

The air is cleaned in the air filter elements 24, and then it flows downstream at arrows 26 into gas turbine generator 28, where it is used to generate power.

B. Overview of Air Filter Arrangement

One example of an air filter element 24 usable in system 20 is shown in FIGS. 2-15. In general, and by way of a non-limiting example, the air filter element 24 includes a single seamless media pack 30, a first end cap 40, a second end cap 50, a frame member 60 and a gasket 70. The filter element 24 can be oriented within at least one of the tube sheet apertures 28 and sealed against the tube sheet 27 via frame member 60 and gasket 79. A plurality of filter elements 24 can also be installed in tube sheet 27. In general, air flow is taken in through the air intake system 22 and flows through filter element(s) 24. After exiting filter element(s) 24, air is directed into the generator 28.

C. The Media Pack

In reference now to FIGS. 2-15, the media pack 30 of filter element 24 is for filtering an air stream and is configured to allow for flow from an upstream side 31a to a downstream side 31b. FIGS. 16 and 17 show alternative embodiments of a media pack 30b, 30c, respectively. The following description of media pack 30 is equally applicable to media packs 30b and 30c and additional discussion regarding these embodiments is only presented to show where differences exist.

In the exemplary embodiment shown, the media pack 30 has a first end 32a and an opposite second end 32b. The media pack 30 is also shown as having a first lateral side 33a and a second lateral side 33b. The first and second lateral sides 33a, 33b extend between the first and second opposite ends 32a, 32b. Media pack 30 also has a width w that is defined by the upstream side 31a and the downstream side 31b.

The media pack 30 can be constructed from a single section of seamless pleated media having a plurality of pleats 34. Pleats 34 are shown schematically on FIG. 15 and are not shown on the other figures for the purposes of clarity. As shown, pleats 34 are longitudinally oriented such that the pleats extend from the first and second opposite ends 32a, 32b and define the width w of the media pack 30. The pleats 34 can be constructed of any suitable filtration material. Media pack 30 can also be constructed with a structural or safety screen 80 on the upstream or downstream side 31a, 31b of the pleats 34. In the particular embodiment shown in FIG. 6, screen 80 is adjacent to the downstream side 31b of media pack 30.

Figure 15:
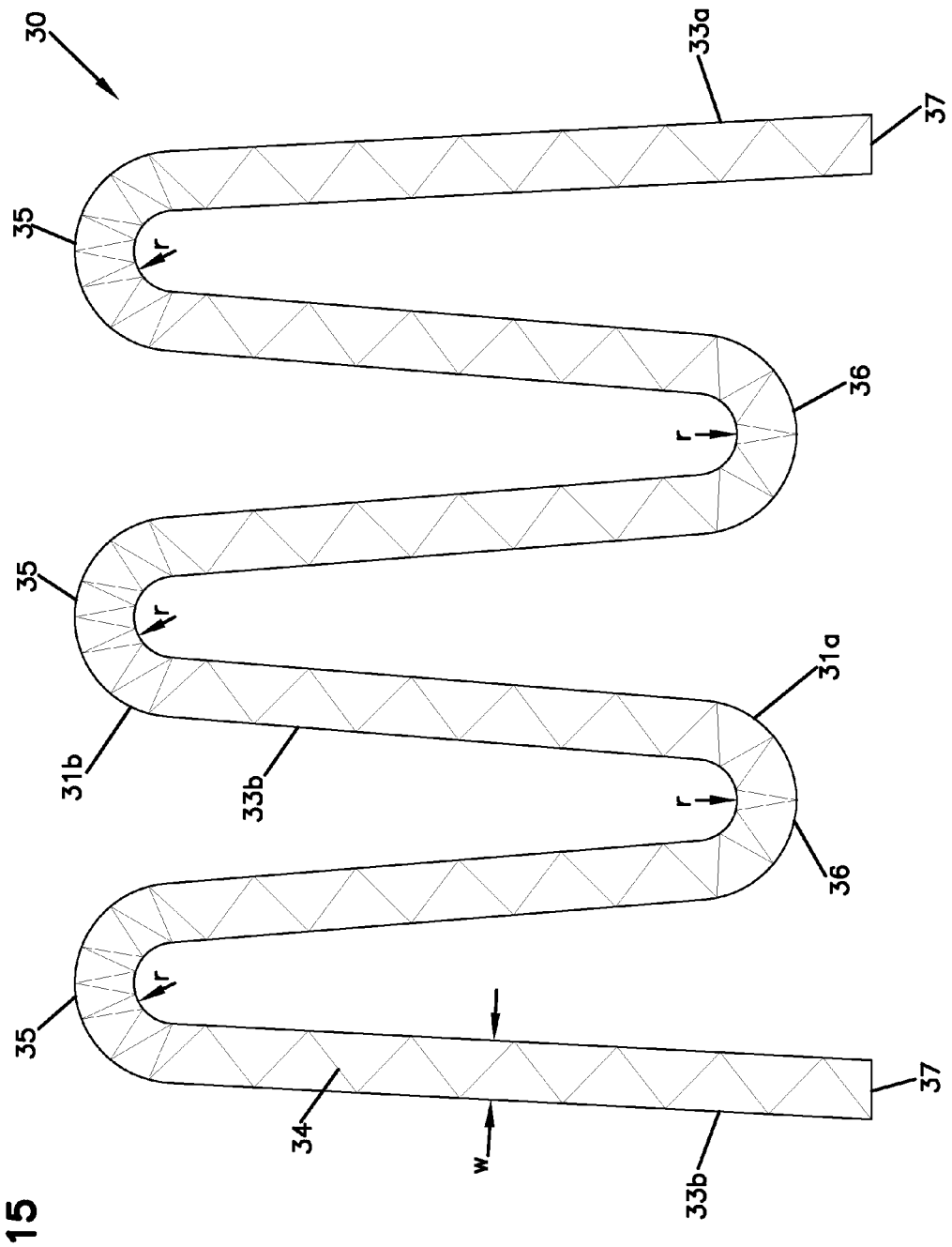
FIG. 15 is a schematic, cross-sectional view of a media pack of the filter element of FIG. 1, taken along the line 15-15 shown in FIG. 3.

As most easily seen in FIGS. 2 and 15, media pack 30 has a first cross-section 15-15 defined between the first and second lateral sides. For reference purposes, the first cross-section 15-15 is taken along the line 15-15 shown on FIG. 3. As shown, in the exemplary embodiment of FIGS. 2-15, first cross-section 15-15 includes at least one outward projection 35. The media pack can have two outward projections 35, as shown in a second embodiment of a media pack 30b at FIG. 16 or even one outward projection 35, as shown in a third embodiment of a media pack 30c at FIG. 17. More preferably, media pack 30 has three outward projections, as shown in FIG. 15. However, it will be appreciated by one skilled in the art that media pack 30 can have any number of outward projections. The media pack can also have an inward recess 36, as shown in FIG. 15 and in the second embodiment of FIG. 16. The media pack can also be configured without an inward recess 36, as shown in FIG. 17. More preferably, media pack 30 has two inward recesses, as shown in FIG. 15. However, it will be appreciated by one skilled in the art that media pack 30 can have any number of inward recesses given that a corresponding number of outward projections are provided.

As can be seen at FIGS. 15-17, outward projections 35 and inward recesses 36 define an internal radius r. As constructed, media pack 30 is fanned around each radius such that a plurality of pleats 34 extend around each internal radius r. This is in contrast to some prior art systems wherein the pleats at the projections or recesses must be folded flat in order to reverse the direction of media pack. As such, the fanning of the pleats about a radius eliminates a time consuming process while ensuring that the pleated media remains uncompromised.

In practice, the number of pleats 34 that extend around each internal radius r depends upon the value of radius r and the number of pleats per inch of the media pack. Necessarily, as the number of pleats per inch increases, more pleats will extend about a given internal radius r. Conversely, as each internal radius r increases, fewer pleats will extend about each internal radius r. In typical installations, the number of pleats 34 that extend around the internal radius r will be from 2 to 80 pleats. More preferably, the number of pleats 34 extending around the internal radius r will be between 25 and 50. Internal radius r can be at least about ¼ inch and up to about 4 inches, preferably between 0.6 and 0.9 inches, and most preferably about ¾ inch. It should be noted that the value of the internal radius r can vary for each outward projection 35 and/or inward recess 36. Further, internal radius r can be variable within an individual outward projection 35 and/or inward recess 36 such that a non-circular path is defined by the internal radius r, such as for example, an elliptical arc. The number of pleats per inch can also be varied as well.

In embodiments where the media pack comprises at least two outward projections 35 and one inward recess 36, the first cross-section of the media pack 30 or 30b will have a wavy shape. By use of the term "wavy shape" it is meant that the first cross-section of media pack 30 or 30b has a shape comprised of oppositely curved sections at the inward recess(es) 36 and outward projections 35 that are separated by either straight or curved sections of media pack. A "wavy shape" is contrasted with a "zigzag" shape or "v-shape" wherein only straight sections of media are joined together to form either flat ends or points such that no curved sections are present at the inward recesses and outward projections.

D. End Caps

In the exemplary embodiment shown, filter element 24 also includes a first end cap 40 and a second end cap 50. End caps 40, 50 are for providing structural support for filter element 24, for retaining the cross-sectional shape of filter element 24 and for ensuring that the air to be filtered passes through media pack 30 before travelling downstream to, for example, the intake system of a gas turbine. As shown, first and second end caps 40, 50 are secured to the media pack 30. As can be best seen at FIGS. 2 and 5, first end cap 40 is secured to the first end 32a of the media pack 30 while second end cap 50 is secured to the second end 32b of the media pack 30. First and second end caps 40, 50 may be secured to media pack 30 with urethane, adhesive, or by any other means understood in the art. First and second end caps 40, 50 have similar constructions and therefore only first end cap 40 will be further described. It should be noted that the description for first end cap 40 is entirely applicable to second end cap 50.

First end cap 40 is shown as including a filter side 41a and a non-filter side 42b. Filter side 41a includes a channel 42. Channel 42 is for providing a pathway to secure the first and second lateral ends 33a, 33b of the filter media 24 such that the media pack 30 retains its desired cross-sectional shape. As such, channel 42 has a width w and a shape sufficient to accommodate the shape of media pack 30 as defined by cross-section 15-15. More specifically, channel 42 has outward projections 42a and inward recesses 42b that generally correspond respectively to outward projections 35 and inward recesses 36 of media pack 30. The inward recesses 42b and outward projections 42a of channel 42 are also defined about an internal radius r which generally corresponds to the internal radius r of the media pack 30. In lieu of channels 42, end cap 40 could be constructed with tabs or any other similar feature or combination of features that would retain the cross-sectional shape of media pack 30.

First end cap 40 is also shown as including webbing portion 43 and angled portion 44. Webbing portion 43 is for adding structural integrity to end cap 40 and for directing airflow in a desired direction. Angled portion 44 is for positively engaging gasket 70 and frame member 60 to ensure a seal between frame member 60 and first end cap 40. Frame member 60 and gasket 70 are discussed in further detail later.

FIG. 26 shows a schematic side view of the second end cap 50. In the particular embodiment depicted, the second end cap 50 has a sloped surface 51, shown in broken lines. The sloped surface 51 is sloped in a downward direction from a downstream end 53 to an upstream end 55. The sloped surface 51 slopes upwardly in a direction from the frame member 60 toward the upstream end 55. This sloped surface 51 facilitates draining of moisture that may collect on the end cap 50 during filtering, causing the moisture to drain away from the media pack 30 and out through the inlet end (upstream end 55). The sloped surface 51 is angled between 0.5 degrees and 3 degrees.

E. Frame Member & Gasket

In the embodiment shown, filter element 24 includes a frame member 60. Frame member 60 is primarily for providing a mounting and sealing surface for filter element 24 and also adds structural stability to filter element 24. On frame member 60, a gasket 70 can be provided to further seal the frame 60 against the mounting surface.

As shown, frame member 60 is a frame formed from top portion 61, bottom portion 62, first side portion 63 and second side portion 64, each of which are cut to a desired length and joined together using methods known in the art. Top portion 61 and bottom portion 62 each have a first channel 61a, 62a, respectively while first and second side portions 63, 64 also each have a first channel 63a, 64a, respectively. First channels 61a, 62a, 63a, 64a are for securing a gasket 70. Gasket 70 is for providing a seal against a tube sheet or other mounting surface, and for ensuring a seal between the first and second end caps 40, 50 and frame member 60. Gasket 70 may be retained in channels 61a, 62a, 63a, 64a by a press-fit construction, through the use of an adhesive such as urethane, or by other means known in the art. As installed, gasket 70 is routed along channels 61a, 62a, 63a and 64a continuously about frame member 60 to provide a seal against the mounting surface.

The top portion 61 and bottom portion 62 also each have a second channel 61b, 62b respectively. The second channels 61b, 62b are for securing the front ends 37 of the media pack 30. The second channels 61b, 62b also engage a portion of the first and second lateral sides 33a, 33b of media pack 30 in addition to a portion of upstream side 31a. The front ends 37, a portion of upstream side 31a and a portion of the lateral sides 33a, 33b of the media pack 30 are secured to the second channels 61b, 62b through the use of a suitable adhesive, such as urethane.

First and second side portions 63, 64 also each have a second channel 63b, 64b for securing a forward edge 45 of end caps 40, 50, respectively. The second channels 63b, 64b also engage a portion of the filter side 41a and non-filter side 41b of the first and second end caps 40, 50, respectively. The forward edge 45 and the portion of filter side 41a and non-filter side 41b of end caps 40, 50 are secured to the second channels 63b, 64b through the use of a suitable adhesive, such as urethane. Also, first and second side portions 63, 64 are shown as comprising tabs 65 for additionally securing frame 60 to the first and second lateral sides 33a, 33b of the media pack 30.

As assembled, frame member 60 is thus secured to the first end cap 40, the second end cap 50, the first lateral side 33a of the media pack 30, the second lateral side 33b of the media pack 30, a portion of upstream side 31a and the front ends 37 of the media pack 30. Gasket 70, thus extends along the first end cap 40, the second end cap 50, the first lateral side 33a and the second lateral side 33b.

Once the first and second end caps 40, 50 and frame member 60 are secured to media pack 30 no further structural members are required for filter element 24. This is in contrast to many standard preferred designs for gas turbines systems having a configuration of six to eight panel style filter elements arranged in a v-shape or zigzag shape configuration. These preferred standard designs require additional structural members extending between the end caps that obstruct airflow or require additional structural members near the lateral sides of the media pack that are the full depth of the pleated media. As such, a greater flow rate or lower pressure drop can be realized with a filter element 24 of the present disclosure over such standard systems. Further, these standard designs typically use caps on the end of each pleat pack and are usually potted using urethane or adhesives. This is a very labor intensive process in which there are ample opportunities for failures and leaks. Because such end caps and other additional structural members are not needed, the disclosed design has fewer parts to purchase and assemble and production costs are therefore reduced. A filter element of the present disclosure can be formed in the general shape to produce a mini-pleat or multi-V style filter that has reduced leakage and failure rates.

F. Methods

A method for making a filter element 24 according to the concepts presented herein is outlined by the following steps: Providing a single seamless media pack 30 that has first and second opposite ends 32a, 32b and first and second lateral sides 33a, 33b extending between the first and second ends 32a, 32b, the media pack 30 having pleats 34 extending between the first and second ends 32a, 32b. Bending the media pack 30 to form at least one outward projection 35 that defines an internal radius r of at least ¼ inch, the media pack 30 being fanned around each internal radius r, a plurality of the pleats 34 extending around each internal radius r. Securing a first end cap 40 to the first end 32a of the media pack 30. Securing a second end cap 50 to the second end 32b of the media pack 30. Securing a frame member 60 holding a gasket 70 to the first end cap 40, second end cap 50, the first lateral side 33a, and the second lateral side 33b, the gasket 70 extending along the first end cap 40, second end cap 50, first lateral side 33a, and second lateral side 33b.

The step of bending the media pack 30 can also include bending the media pack 30 into a wavy shape with at least 2 outward projections 35 and at least 1 inward recess 36, the at least one inward recess 36 defining an internal radius r of at least ¼ inch, the media pack 30 being fanned around each internal radius r, a plurality of the pleats 34 extending around each internal radius r. The step of bending the media pack 30 can also be such that at least three pleats 34 extend around each internal radius r.

Also the step of securing the first end cap 40 to the first end of the media pack 32a can include potting the first end of the media pack 30 to the first end cap 40 with urethane or adhesive. Similarly, the step of securing the second end cap 50 to the second end 32b of the media pack 30 can include potting the second end 32b of the media pack 30 to the second end cap 50 with urethane or adhesive. The method can also include the step of securing a screen 80 to a downstream side 31b of the media pack 30 or be such that the media pack 30 has an upstream side 31a that is free of obstructions extending between the first and second end caps 40, 50.

G. The Embodiment of FIGS. 18-25

It was recognized that the filter element 24 would perform better if it had a pre-filter. It was desired to have a pre-filter that would be replaceable and extend the life of the higher-efficiency filter element 24. It was desired to have few parts, easy assembly, and easy installation. In prior art pre-filters, typically pleated panel filters are used, and these panel filters may be made of wax coated cardboard that easily collapses as restriction rises or exposure to heat and moisture occurs. In addition, many prior art filters use cardboard, metal, or plastic end caps that add cost to the product. Prior art pre-filter panels add to the initial restructure, more so than the below-described pre-filter.

In FIG. 19, one embodiment of a pre-filter is shown at 100. In this embodiment, the pre-filter 100 is embodied as a pad 102. The pad 102 comprises non-pleated media 104. The media 104 can be fibrous, depth media, for example. Other types of media are usable. In addition, the efficiency of the media can be adjusted and changed depending upon the desired level of filtration, restriction, and efficiency for the system.

As can be seen in FIG. 19, in this embodiment, the pre-filter 100 is frameless, in that it has no end caps or any rigid structure holding the media 104. The pad 102 is also seamless.

In the embodiment of FIG. 19, the pre-filter 100 is formed as a generally rectangular piece, having a first end 106 and an opposite second end 108. In this embodiment, the first and second ends 106, 108 are generally parallel to each other, although they would not need be. Extending between the first end 106 and second end 108 are first and second edges 110, 112. In this embodiment, the first and second edges 110, 112 are generally parallel to each other, although they need not be. The pad 102 will also have a first side 114 and a second side 116. In use, one of the first side 114 and second side 116 will be an upstream side, while the other is a downstream side. The downstream side will be generally oriented against the upstream side of the media pack 30 of the filter element 24. In many embodiments, the pad 102 will be reversible, in that either the first side 114 or the second side 116 is usable as an upstream side, with the opposite being usable as a downstream side.

In general, the pad 102 has a thickness between the first side 114 and second side 116 that is not greater than 2 inches. The thickness will generally be at least 0.25 inches.

As can be seen in FIG. 18, the pre-filter 100 is oriented against at least some of the upstream pleat tips 118 of the media pack 30 between the first and second lateral sides 33a, 33b. The pre-filter 100 is also within the internal radius r of the upstream side 31a. In the embodiment depicted in FIG. 18, the pre-filter 100 is oriented against all, or nearly all, of the upstream pleat tips 118.

Figure 21:
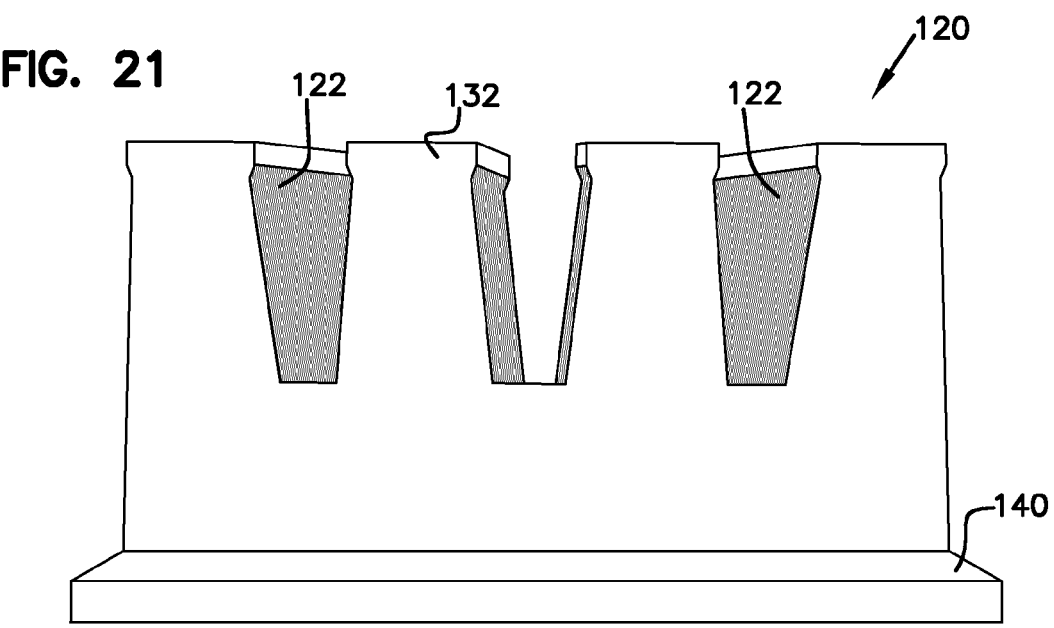
FIG. 21 is top, perspective view of the filter element of FIG. 20, but without the pre-filter.
Figure 22:
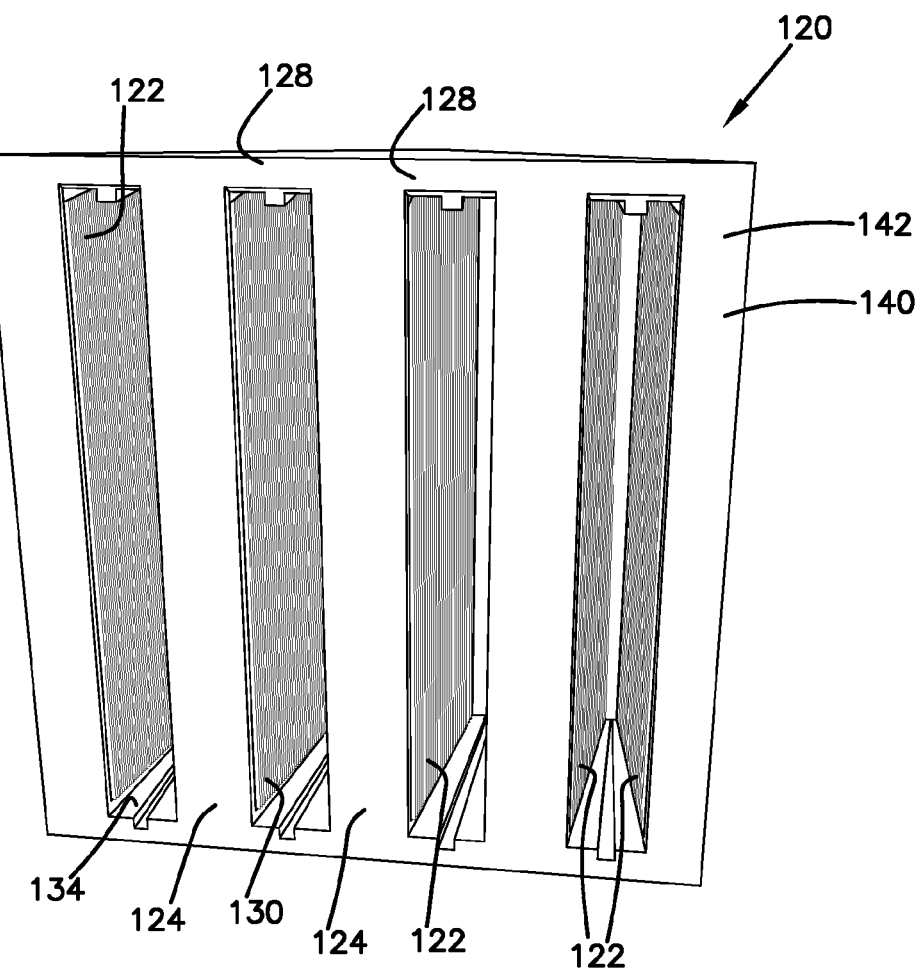
FIG. 22 is a front, perspective view of the filter element of FIGS. 20 and 21, but without the pre-filter.

The pre-filter 100 is also usable with a standard mini pleat/multi-v panel filter element 120. An example of a multi-v panel element 120 is shown in FIGS. 21 and 22. The element 120 includes a plurality of media extension 122 arranged adjacent to each other, with adjacent ones of the media extension 122 forming a vertex 124 and diverging from the vertex 124. Of course, this definition of media extensions 122 arranged adjacent to each other and forming a vertex and diverging from the vertex is also equally applicable to the filter element 24, described with respect to FIGS. 1-17, above. The media extensions 122 are typically pleated. The pre-filter 100 is removably oriented against the upstream side 126 of each of the media extensions 122 and within the vertices 124. See FIG. 20.

In FIG. 22, it can be seen how each of the media extensions 122 includes first and second opposite ends 128, 130. A first end cap 132 (FIG. 21) is secured to each of the first ends 128, while a second end cap 134 (FIG. 22) is secured to each of the second ends 130 of the media extensions 122. The element 120 further includes a first lateral side 136 and a second lateral side 138, as can be seen in FIG. 20. A frame member 140 (FIG. 22) is secured to the first end cap 132, the second end cap 134, the first lateral side 136, and the second lateral side 138. A gasket 142 is held by the frame member 140, such that the element 120 can be sealed against a tube sheet in a gas turbine air intake system.

Turning again to FIG. 20, the pre-filter 100 is oriented against the upstream side 126 of each of the media extensions 122 between the first lateral side 136 and the second lateral side 138. In this embodiment, the pre-filter 100 does not go the full extension to be in contact with the vertex 124, but rather, is spaced from the vertex 124. In other embodiments, the pre-filter 100 can be oriented to go the complete distance along each of the media extensions 124 and be in contact with the vertex 124 of each v-pack 144.

In accordance with principles of this disclosure, there is included a means for removably holding the pre-filter 100 against the upstream side of the media pack. As used herein, the term "upstream side" can refer to the upstream side 31a of the media pack 24 or the upstream side 126 or the v-pack 144 of the v-panel element 120. Of course, the element 24 and the element 120 are just two examples of many embodiments of filter elements that are usable herein, and the term "upstream side" would refer to the upstream side of any applicable embodiments.

Examples of means for removably holding pre-filter 100 are shown in FIGS. 23, 24, and 25. The means for removably holding, as used herein, refers to the structure shown in FIGS. 23-25, and any functional equivalents.

One embodiment of a means for removably holding the pre-filter 100 includes a rod assembly 150, FIG. 23. The rod assembly 150 includes a first rod 152 extending between the first and second end caps 128, 130 along the first lateral side 33a. The first rod 152 is generally flexible and longer length than the length between the first and second end caps 40, 50 for element 24 or 132, 134, for element 120. In this manner, the first rod 152 can be oriented within one of the end caps, on the upstream side of the pre-filter 100, such that the pre-filter 100 is trapped between and against the first rod 152 and the upstream side of the media pack. The first rod 152 is then flexed in order to bend it and orient it within the other end cap. After being oriented within the other end cap, the first rod 152 goes back to its normal, unflexed condition. There is also a second rod extending between the first and second end caps along the second lateral side. The second rod operates the same ways as the first rod 152, and the drawing of the second rod looks identical to the first rod 152.

Another example of a means for removably holding the pre-filter 100 against the upstream side of the media pack is shown in FIG. 24. In this embodiment, the means includes a first clip 158. The first clip 158 is secured by a friction grip to the frame member 60, 140 along the first lateral side 33a, 136. The first clip 158 holds, presses, or pinches the pre-filter 100 between and against the first clip 158 and the upstream side of the filter element 24, 120. The first clip 158 can be conveniently placed and removed from the element 24, 120. Analogously, there is a second clip secured to the frame member 60, 140 along the second lateral side 33b, 138. A drawing of the second clip looks identical to the first clip 158.

Another example of a means for removably holding the pre-filter 100 against the upstream side of the media pack is shown in FIG. 25. In this embodiment, the means includes a first strip 166 of a hook-type fastener secured to the frame member 60, 140 along the first lateral side 33a, 36. The pre-filter pad 102 is typically made of a media that comprises loops that mate with the hooks on the first strip 166, similar to the material VELCRO™. Analogously, along the second lateral side 33b, 138 of the frame member 60, 140, there is a second strip (which looks identical to the first strip 166) of hook-type fastener that mates with the loops that are part of the media 104 of the pad 102 of the pre-filter 100. This secures the pre-filter against the upstream side of the media pack and adjacent to the first lateral side 33a, 136 and second lateral side 33b, 138.

It should be understood that the pre-filter 100 is usable with the elements 24, 120, as part of an air intake for gas turbine system. It is also usable with methods of making a filter element, by including the step of removably securing the pre-filter 100 to the upstream side of the media pack. The step of securing would include using one of flexible rods, clips, or hook-type fasteners to secure the pre-filter 100 to the media pack.

With regard to the foregoing description, it is to be understood that changes may be made in detail, especially in matters of the construction materials employed and the shape, size and arrangement of the parts without departing from the scope of the present invention. It is intended that the specification and depicted aspects be considered exemplary only.

What is claimed is:

1. A filter element comprising:
  (a) a media pack having first and second opposite ends and first and second lateral sides extending between the first and second ends; the media pack having pleats extending between the first and second ends;
    (i) the media pack having a first cross-section defined between the first and second lateral sides;
    (ii) the first cross-section having at a wave shape with at least one internal radius;
      (A) the media pack being fanned around the internal radius, a plurality of the pleats extending around the internal radius in substantially non-touching engagement with each other around the internal radius;
  (b) a first end cap secured to the first end of the media pack;
  (c) a second end cap secured to the second end of the media pack;
  (d) a frame member secured to the first end cap, second end cap, the first lateral side, and the second lateral side; and
  (e) a gasket held by the frame member; the gasket extending along the first end cap, second end cap, first lateral side, and second lateral side.

2. A filter element according to claim 1 wherein:
  (a) the second end cap has a sloped surface, sloping upwardly in a direction from the frame member.

3. A filter element according to claim 1 wherein:
  (a) the wave shape has at least two projections and one inward recess, the inward recess defining the internal radius, the internal recess being no greater than 4 inches.

4. A filter element according to claim 3 wherein:
  (a) the media pack is a single, seamless media pack.

5. A filter element according to claim 1 wherein:
  (a) the wave shape has at least three outward projections and at least two inward recesses, each inward recess having an internal radius; and
  (b) each internal radius is at least ¼ inch.

6. A filter element according to claim 1 wherein:
  (a) the filter element further includes a screen, the screen being adjacent to a downstream side of the media pack;
  (b) the media pack has an upstream side, the upstream side being free of airflow obstructions extending between the first and second end caps;

(i) the plurality of pleats on the upstream side having upstream pleat tips.

7. A filter element according to claim 6 further comprising:
(a) a pre-filter comprising a removable and replaceable, frameless, seamless, non-pleated pad of media;
   (i) the pre-filter being oriented against at least some of the upstream pleat tips between the first and second lateral sides and within the internal radius.

8. An air intake for a gas turbine system; the air intake comprising:
(a) a tube sheet having a plurality of apertures;
(b) a filter element oriented within at least at least one of the apertures and sealed against the tube sheet; the filter element including:
   (i) a media pack having first and second opposite ends and first and second lateral sides extending between the first and second ends; the media pack having pleats extending between the first and second ends;
      (A) the media pack having a first cross-section defined between the first and second lateral sides;
   (ii) the first cross-section having a wave shape that defines an internal radius of at least ¼ inch;
      (A) the media pack being fanned around the internal radius, a plurality of the pleats extending around the internal radius in substantially non-touching engagement with each other around the internal radius;
   (ii) a first end cap secured to the first end of the media pack;
   (iii) a second end cap secured to the second end of the media pack;
   (iv) a frame member secured to the first end cap, second end cap, the first lateral side, and the second lateral side; and
   (v) a gasket held by the frame member; the gasket extending along the first end cap, second end cap, first lateral side, and second lateral side;
      (A) the gasket forming a seal against the tube sheet.

9. An air intake according to claim 8 wherein:
(a) the wave shape has at least two projections and one inward recess, the inward recess defining an internal radius of at least ¼ inch; and
(b) the second end cap has a sloped surface.

10. An air intake according to claim 9 wherein:
(a) the wave shape has at least three outward projections and at least two inward recesses.

11. An air intake system according to claim 8 wherein:
(a) the media pack is a single, seamless media pack.

12. An air intake system according to claim 8 further comprising:
(a) a plurality of filter elements; each of the filter elements being oriented in one of the apertures and sealed against the tube sheet; each of the filter elements including:
   (i) a media pack having first and second opposite ends and first and second lateral sides extending between the first and second ends; the media pack having pleats extending between the first and second ends;
      (A) the media pack having a first cross-section defined between the first and second lateral sides;
   (ii) the first cross-section having a wave shape that defines an internal radius of at least ¼ inch;
      (A) the media pack being fanned around the internal radius, a plurality of the pleats extending around the internal radius;
   (ii) a first end cap secured to the first end of the media pack;
   (iii) a second end cap secured to the second end of the media pack;
   (iv) a frame member secured to the first end cap, second end cap, the first lateral side, and the second lateral side; and
   (v) a gasket held by the frame member; the gasket extending along the first end cap, second end cap, first lateral side, and second lateral side;
      (A) the gasket forming a seal against the tube sheet.

13. An air intake system according to claim 12 wherein:
(a) the wave shape has at least two projections and one inward recess, the inward recess defining an internal radius of at least ¼ inch;
(b) the media pack has an upstream side, the upstream side being free of airflow obstructions extending between the first and second end caps;
   (i) the plurality of pleats on the upstream side having upstream pleat tips; and
the air intake system further comprises:
a pre-filter comprising a removable and replaceable, frameless, seamless, non-pleated pad of media;
   (i) the pre-filter being oriented against at least some of the upstream pleat tips between the first and second lateral sides and within the internal radius.

14. An air intake system according to claim 13 further comprising:
(a) means for removably holding the pre-filter against the upstream side of the media pack.

15. A method of making a filter element; the method comprising:
(a) providing a media pack having first and second opposite ends and first and second lateral sides extending between the first and second ends; the media pack having pleats extending between the first and second ends;
(b) bending the media pack to form at a wave shape defining a plurality of internal radii, each of at least ¼ inch;
   (i) the media pack being fanned around each internal radius, a plurality of the pleats extending around each internal radius in substantially non-touching engagement with each other around the internal radius;
(c) securing a first end cap to the first end of the media pack;
(d) securing a second end cap to the second end of the media pack; and
(e) securing a frame member holding a gasket to the first end cap, second end cap, the first lateral side, and the second lateral side;
   (i) the gasket extending along the first end cap, second end cap, first lateral side, and second lateral side.

16. The method of claim 15 wherein:
(a) the step of providing a media pack includes providing a single, seamless media pack.

* * * * *